(12) United States Patent
Stark et al.

(10) Patent No.: US 9,352,974 B2
(45) Date of Patent: May 31, 2016

(54) FOOD PRODUCT CONTAINING TABLE SALT FORMULATION

(75) Inventors: Wendelin Jan Stark, Zurich (CH); Samuel Claude Halim, Zurich (CH); Eapen George, Frisco, TX (US); Carlos Jose Barroso, Dallas, TX (US)

(73) Assignee: Frito-Lay Trading Company, Gmbh, Bern (CH)

( * ) Notice: Subject to any disclaimer, the term of this patent is extended or adjusted under 35 U.S.C. 154(b) by 926 days.

(21) Appl. No.: 12/866,210

(22) PCT Filed: Feb. 4, 2008

(86) PCT No.: PCT/CH2008/000042
§ 371 (c)(1),
(2), (4) Date: Aug. 4, 2010

(87) PCT Pub. No.: WO2009/097699
PCT Pub. Date: Aug. 13, 2009

(65) Prior Publication Data
US 2011/0003037 A1  Jan. 6, 2011

(51) Int. Cl.
*A23L 1/237* (2006.01)
*C01D 3/26* (2006.01)
*C01D 3/04* (2006.01)

(52) U.S. Cl.
CPC . *C01D 3/26* (2013.01); *A23L 1/237* (2013.01); *C01D 3/04* (2013.01)

(58) Field of Classification Search
USPC ........................................ 426/649
See application file for complete search history.

(56) References Cited

U.S. PATENT DOCUMENTS

| 2,664,357 A * | 12/1953 | Miller ........................... 426/650 |
| 2004/0224076 A1 | 11/2004 | Derrien et al. |
| 2006/0286239 A1 * | 12/2006 | Rasouli et al. ................ 426/534 |

FOREIGN PATENT DOCUMENTS

| BE | 902690 | 10/1985 |
| EP | 0417062 | 3/1991 |
| JP | 05017129 | 1/1993 |
| WO | 8500958 | 3/1985 |
| WO | 9853708 | 12/1998 |
| WO | 2007112501 | 10/2007 |

OTHER PUBLICATIONS

Choi: NaCl particle interaction with 193-nm light: Ultraviolet photofragmentation and nanoparticle production; Journal of Applied Physics 97, 124315, 2005.*

Grass: Flame synthesis of calcium-, strontium-, barium fluoride nanoparticles and sodium chloride; Received (in Cambridge, UK) Dec. 21, 2004, Accepted Jan. 21, 2005, First published as an Advance Article on the web Feb. 3, 2005; DOI: 10.1039/b419099h.*

Palzer: The effect of glass transition on the desired and undesired agglomeration of amorphous food powders; Nestlé Product Technology Centre, Lange Strasse 21, D-78224 Singen, Germany; Available online Apr. 9, 2005.*

* cited by examiner

*Primary Examiner* — Patricia George
(74) *Attorney, Agent, or Firm* — James R. Gourley; Colin P. Cahoon; Carstens & Cahoon, LLP

(57) ABSTRACT

The present invention relates to food products which are dry and which contain a table salt formulation characterized in that said table salt formulation comprises a mixture of at least two types of particles of one or more physiologically acceptable inorganic salts and at least one of the type of said particles is composed of primary particles of which at least 50 wt % are 5-5000 nanometer in diameter; to manufacturing methods of such food products; further it relates to specific table salt formulations, to manufacturing methods and methods of use of such table salt formulations.

13 Claims, No Drawings

FOOD PRODUCT CONTAINING TABLE SALT FORMULATION

CROSS-REFERENCE TO RELATED APPLICATION

This application is a 371 National Phase filing under Chapter II of International Application No. PCT/CH2008/000042 filed 4 Feb. 2008.

TECHNICAL FIELD

The present invention relates to food products containing table salt formulations; to manufacturing methods of such food products; further it relates to specific table salt formulations, to manufacturing methods and methods of use of such table salt formulations.

BACKGROUND ART

Table salt is used to augment and enrich flavor of food products: it contains essential minerals for human life and is considered as a cultural part of cooking. The widespread use of table salt, however, also bears risks and disadvantages. High sodium levels in blood are associated with severe diseases or disorders, such as high blood pressure, kidney failure, heart attacks. This results in large endemic costs to societies and is a major contributing factor to rapidly growing health care cost in western societies.

It is also known that the taste of certain sea salts, e.g. fleur de sel, differ from the taste of standard table salt in a beneficial way. Such salts are, however, difficult to obtain and/or are not consistent in their quality. Such inconsistent quality and availability do not make application of such salts amenable to large scale industrial manufacturing. Hence, a reliable and scalable process for substituting such advantageous natural salts is required.

A number of documents disclose and claim the reduction of sodium in table salts (WO85/00958, BE902690, EP0417062, WO98/53708, US 2004/0224076) by the substitution of sodium chloride with different other salts, e.g. KCl, or different magnesium salts. Said compositions provide a salt flavor enhancing effect to food products containing such compositions. The disclosed compositions contain relatively high amounts of sodium and are not satisfactory with regards to their taste.

The prior art relating to the field of salt perception and salt delivery can be best separated into two subfields using a distinction based on the food's characteristics:

A) A distinct group of applications of salt is made on wet foodstuff, e.g. soups, sauces, mashed potatoes, beverages, or bread. This group of food is characterized by the fact that the salt is present in the form of aqueous ions broadly distributed within the food material. During preparation of the food, the salt is added in a process step where abundant liquid is present. As a result, the salt dissolves and is homogeneously distributed within the food material. A special case of products are "ready to use" powder soups (so called instant soups where the ingredients are present as a dry mixture but hot water added by the consumer also results in dissolution of the salt); these products are added to this group as the consumer makes the last processing step during preparation of the soup.

B) A different distinct set of applications of salt concerns dry foodstuff. This group contains dry snacks, dry, processed food such as fried or baked chips (e.g. potato, rice, wheat chips), scones, pastries, and others. During the preparation of this group of materials, salt is added in a dry form within one or more distinct processing steps. Insufficient liquid is present to dissolve and redistribute the salt. As a result, distinct salt grains are scattered on or within the food material. The consumer eats the material without further processing in contrast to e.g. instant soups (see group A).

As a direct consequence of above distinction, group A must specify a salt according to composition as ions well distributed throughout the material. No groups of cations and anions can be assigned to one another. Salts are typically identified or described as mixtures of specific mass content of specific ingredient salts (e.g. 90 wt % NaCl, 8 wt % KCl, 2 wt % $CaCl_2$-$6H_2O$). However, if looking at the food material, no distinct remainders of the ingredients can be identified beyond the ions that make up the salt.

While intuition may suggest that salt perception only depends on the chemical composition as described in the prior art (see above), the inventors of the present invention have surprisingly found a significantly improved salt perception on dry foodstuff if a specific structure and substructure of the salt constituents is provided. In particular the fact that ingredients for table salts (e.g. NaCl, KCl, Ca and Mg chlorides or sulfates, others) can be combined in specific ways, as further described below, will result in different and improved salt perception during consumption of the dry food.

DISCLOSURE OF THE INVENTION

Hence, it is a general object of the invention to provide a dry food product that overcomes one or more of the problems of the known dry food products. In particular, the present invention aims to provide dry food products that simultaneously delivery salty perception to the consumer whilst reducing sodium uptake. Further, the invention aims to provide cost effective and reproducible preparation of large amounts of such food products and the corresponding table salt formulations. The invention also aims to provide a platform of designed salts that can both deliver improved saltiness at reduced sodium consumption and that can be adapted to a broad variety of dry food products.

These objectives are achieved by a food product as defined in claim 1 and a table salt formulation as defined in claim 9. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

The term "table salt" is known in the field. It particularly denotes a composition traditionally mainly containing NaCl, intended for human consumption, which may contain fluorine and/or iodine sources as well as further components to improve handling. The term implies certain purity of all components, defined by national legislation. Since it has recently been found that some other inorganic salts are also perceived as salty by the human tongue, table salts can contain substantial amounts of these other salts, namely potassium and magnesium salts. This directly reflects the fact that neurologically, the salt perception is a combination of anion and cation detection on the tongue. However, saltiness is not unique to NaCl and therefore, other inorganic salts suitable to human nutrition have been applied.

The term "food product" is known in the field. It particularly denotes any solid product intended for human alimentation. Particular relevant are in the context of the invention are dry food products, especially snack food products (e.g. potato chips, tortilla chips, crackers, popcorn and the like); cereals, scones, pastries. A food product is considered "dry" if it does not contain enough water to dissolve all table salt present therein; thus salt particles are present in said product. Typically, the water content of such dry food product is below 10 wt %, preferably below 5 wt %.

The term "Primary Particle" is known in the field. It particularly denotes a chemically uniform particle of 5-5000 nm, preferably of 20-2000 nm diameter. A particle is considered chemically uniform, if its chemical composition is similar along the diameter of the particle. For example, particles made by an FSP process, such as NaCl or NaCl/KCl particles, are considered chemically uniform, as such particles form a phase considered as a solid solution. As another example, NaCl/SiO2 made by FSP consists of two chemically uniform particle types that can be produced simultaneously. Electron microscopy images show that such materials consist of NaCl particles (uniform within the diameter of the particles) and SiO2 (silica particles, again uniform within the diameter of these particles). Most preparation methods can be used to simultaneously manufacture two or more type of chemically uniform particles within the same production run. This elegant way to directly make mixtures greatly facilitates producation and removes requirement for an additional mixing step. Further, particles obtained by a milling process are considered chemically uniform, as such particles are considered crystalline or micro-crystalline. The shape of primary particles may vary in a broad range and depends on its manufacturing; typically rounded entities or sharp-edged entities of equal dimensions are used.

In the context of this invention, the term "building block" is used synonymous to "Primary particle"; this term further stresses the aim to use such particles for forming "aggregates".

The term "Aggregate" is known in the field. It particularly denotes the aggregation or agglomeration of smaller entities, in the context of this invention, above all the aggregation or agglomeration of building blocks.

The term "Flame Spray Pyrolysis" or "FSP" is known in the field and is a special form of the general term flame synthesis. It particularly denotes a process wherein particles are synthesized by pyrolysis of a sprayed liquid in a flame. Details of suitable apparatuses and process parameters may be found in the examples or in US2004126298, US2006229197, or US2007196259.

The term "Grinding" is known in the field. It particularly denotes a process wherein particles are crushed down to smaller particle sizes. In the context of this invention, the term "grinding" includes, but is not limited to ball milling, e.g. milling in liquid media using a ball mill.

In more general terms, in a first aspect, the invention relates to a dry food product which contains a table salt formulation characterized in that said table salt formulation comprises (i.e. contains or consists of) a mixture of at least two types of particles of one or more physiologically acceptable inorganic salts and in that at least one of the type of said particles is composed of primary particles of which at least 50 wt % (preferably at least 70 wt %) are 5-5000 nanometer in diameter.

This inventive formulation food product exhibits a salty perception while maintaining flavor integrity at reduced sodium levels. In some specific cases, such food product also provides salty perception but with reduced or without the metallic or soap-like off-flavors inherent to aqueous solutions of the similar composition. Without being bound to theory, it is believed that the size of the primary particles and their arrangement has a significant influence to the quality of the food product. Such small particles of table salts have, until now, not been used for the manufacturing of dry food products. It is believed that this is due to the slightly hygroscopic properties of sodium chloride and other inorganic salts amenable to food application, which makes handling and storage of such small particles inconvenient or even impossible. This is typically seen in the form of blocks if salt has been stored under humid conditions. For comparison, typically used table salt has a particle size of about 100 to 1000 micrometer. The above identified small primary particles are available using the manufacturing methods described herein.

The food product of this invention is explained in further detail below.

Primary Particle: In a preferred embodiment, the invention relates to a table salt composition comprising at least 70 wt % particles consisting of NaCl or a NaCl/KCl mixture and at most 30 wt % of particles of one or more physiologically acceptable inorganic salts. In a preferred embodiment, said NaCl/KCl mixtures contain at least 50 wt % NaCl.

In a further preferred embodiment, at least 50 wt % (particular preferably at least 70 wt %) of all primary particles are 5-5000 nanometer in diameter.

Aggregates: In an advantageous embodiment, the invention relates to a food product as described herein, wherein said primary particles are formed to aggregates, said aggregates consisting of $10-10^{15}$, preferably $10^3-10^{12}$, primary particles. The formation of aggregates out of the primary particles, as defined above, further increases the quality or the food product. It is understood and evident to the person skilled in the field that during aggregate formation, the distinction between individual, touching primary particles can become difficult due to partial sintering and formation of so called necks (see e.g. [1]). Such partial sintering helps consolidating the structure of the aggregate and can be made on purpose by heating or compaction or exposure to diluted steam or a combination thereof.

Chemical Composition: In an advantageous embodiment, the invention relates to a food product as described herein, wherein the cation of said one or more physiologically acceptable inorganic salt is selected from the group consisting of alkali metal ions (in particular Na, K), earth alkali ions (in particular Mg, Ca, Sr), transition metal ions (in particular Zn, Fe, Cu, Mn).

In an advantageous embodiment, the invention relates to a food product as described herein, wherein the anion of said one or more physiologically acceptable inorganic salt is selected from the group consisting of phosphates (in particular monophosphates: $PO_4^{3-}$, $HPO_4^{2-}$, $H_2PO_4^-$), sulfates ($SO_4^{2-}$), silicates, hydroxides, halogenides (in particular $F^-$, $Cl^-$, $Br^-$, $I^-$), carbonate or hydrogencarbonate.

In a further advantageous embodiment, the invention relates to a composition as described herein, wherein said physiologically acceptable inorganic salt is selected from the group consisting of NaCl, CaSO4, CaCl2, MgSO4, MgCl2, KCl, as water-free (anhydrous) or hydrated salts).

Morphology: Enhanced saltiness of the inventive food product can be realized using structured salts of a specific structure and substructure, containing other components such as gypsum or magnesium chloride or magnesium sulfate or potassium chloride.

Such sub-structured salts can be described as complex aggregates consisting from a major constituent (preferably composed of sodium chloride or a mixture of sodium and potassium chloride) and minor constituents (consisting of one or more other physiologically acceptable salts as disclosed herein). It was surprisingly found that specific substructures of complex salts can be prepared as to deliver an enhanced salt perception to a test panel or consumer group whilst delivering significantly less sodium to the consumers. This astonishing finding therefore allows maintaining flavor and salt perception in a dry food product whilst cutting down on sodium delivery without the application of any artificial additive such as glutamate or other flavor enhancers. Latter compounds find wide-spread application in food but have been suspected for a series of sicknesses and, moreover, are incompatible with the concept of organic food or natural or nature-identical food additives. Some of the substructures found in the present invention contain elements that are also found in sea salts grown from evaporating natural sea water in shallow ponds in climatically hot regions. However, latter so called natural sea salts do not have an optimized substructure and composition and can not be adapted readily to the preparation or design of a specific flavor combination. Most natural sea salts are available at very limited supply and their often manually effected collection is labor and cost effective. The present invention overcomes these limitations by providing a toolbox from which optimized salts with an adaptable substructure can be rapidly prepared for a specific application. Suitable substructured salts furthermore are made in a way as to exhibit enhanced shelf life since a rapidly aging material can not be used in processed food applications. There, particularly the effect of humidity on changes in the materials substructure is important.

Distribution: In an advantageous embodiment, the invention relates to a dry food product wherein said table salt formulation is located on one or more surfaces of said food product. In one embodiment, said table salt formulation is homogeneously distributed in said food product, thus also being present on its surfaces. In an alternative embodiment, said table salt formulation is located or essentially located, at one or more of the surfaces of said food product.

In a second aspect, the invention relates to methods for manufacturing a dry food product as described herein.

In one embodiment, such processes comprise the steps of a) manufacturing primary particles in a flame spray process thereby providing an aerosol and b) directly contacting said dry food product with said aerosol. This process is described in further detail below: The production of the building blocks can be made in a flame spray process and the resulting salt containing off gas from the reactor (the aerosol) can be directly fed onto a dry food product. Such direct contact effects aggregation and impaction of the salt formulation with the dry food product and simultaneously effects application of the salt to form the desired substructure. Step a) manufacturing of primary particles is known in the field and also described herein. The direct contact, as described in step b) may be achieved by positioning at least one surface of a dry food product in the off gas of a conventional FSP apparatus which contains the primary particles. The elegance of such a direct process is evident as the difficult handling of ultra fine particles (diameter nanometer to micrometer range) is sensitive.

The invention also relates to a dry food product obtainable by or obtained by a process as described herein.

In a third aspect, the invention relates to specific table salt formulation as described herein. These specific table salt formulations are novel and are found particular suitable to be used for a dry food product as described herein.

Thus, the invention relates to a table salt formulation comprising a mixture of at least two types of particles, wherein each type of particles contains one or more physiologically acceptable inorganic salts and each type of said particles is composed of primary particles of which at least 50 wt % are 5-5000 nanometer in diameter and said primary particles are formed to aggregates containing $10-10^{15}$ of said primary particles.

In an advantageous embodiment, the invention relates to a table salt formulation as described herein wherein the total content of NaCl or a NaCl/KCl mixture is at least 70 wt-% and the total content of other physiologically acceptable salts is at most 30 wt-%.

In an advantageous embodiment, the invention relates to a table salt formulation as described herein wherein a first type of particles contains 90 to 99.5 wt-% NaCl and 0.5-10 wt-% of one or more, preferably one, compound selected from the group consisting of $SiO_2$, $CaCO_3$, $Ca_3(PO_4)_2$, and/or optionally magnesium doped calcium phosphates. Such magnesium doped calcium phosphates may be represented by the formula $(Ca,Mg)_xO_wH_y(PO_4)_z$ and in particular include hydroxyapatite and tricalcumphosphate (TCP).

In a fourth aspect, the invention relates to a process for manufacturing a table salt formulation as described herein. It was found that these processes are particularly suitable for the formation of the above defined primary particles which are small when compared to the particles currently used for table salt formation. In particular, the processes as described herein do circumvent the problem of hygroscopic properties occurring by using the known processes.

Thus, the invention relates to a method of manufacturing a table salt formulation as described herein comprising the steps of forming primary particles of physiologically acceptable inorganic salts by means of a grinding process (in particular a wet mill process) and/or a flame synthesis process (in particular a flame spray pyrolysis process) and/or a precipitation process and/or a spray drying processes; isolating the particles obtained; forming aggregates by mixing, applying heat and/or pressure and/or exposure to diluted steam to the obtained primary particles.

This process allows large-scale production of the table salt formulation as described herein.

The formation of primary particles is known per se and may also be achieved by a precipitation process or other suitable processes like spray drying. Flame synthesis processes are particularly suitable where primary particles are aimed to contain different salt compositions such as NaCl/$SiO_2$ or NaCl/KCl or more complex mixtures. Grinding processes are particular suitable where the corresponding salt is commercially available, but particle size of the commercial product is too large. It is evident that the selection of the best process depends on the chemical composition of said particles; such selection is within the ordinary skill of person skilled in the art.

The invention further relates to a table salt formulation obtained by a process as described herein.

The invention further relates to a salt toolbox, in accordance with the invention, as described herein. Manufacturing of a specific substructure in a table salt formulation as described herein requires two steps: A) Preparation of specific small building blocks consisting of crystallites or amorphous particles of one or several mineral constituents (formation of primary particles) and B) Combination of the building blocks to a specific salt with a defined substructure. Steps A) and B) are explained in further detail below: Step A) Mineral constituents can be alkaline salts consisting of sodium or/and potassium in the form of chloride or phosphate or carbonate or silicate or hydroxide or a mixture of anions (e.g. sodium chloride, potassium chloride, sodium sulphate, potassium sulphate, sodium carbonate), earth alkaline salts consisting of calcium or/and magnesium or/and strontium salt in the form of chloride or sulphate or phosphate or carbonate or silicate or hydroxide or a mixture of anions (e.g. calcium sulphate in all different states of hydration or in the anhydrous form, magnesium carbonate, magnesium hydroxy carbonate), heavy metal salts in suitable concentrations and mixed compositions thereof. Suitable heavy metal salts include iron, manganese, zinc, copper (upper limit: 2 ppm), molybdenum, cobalt and bismuth. These building blocks can be manufactured by top-down approaches like crushing, grinding or milling or by bottom-up techniques like precipitation, spray-drying, sol-gel or combustion processes (flame synthesis, flame spray pyrolysis), alternatively also freeze drying, vacuum drying and other more specific methods may be applied and are evident to the skilled person working in the field or a combination of these methods. Other methods to prepare small inorganic particles of a specific salt are known to the ones working in the field. Typical production methods are e.g. described in, milling which is incorporated by reference. Step B) Combination can be done by mechanical blending and intense mixing, or by choosing production and blending in a combined step. This can e.g. be done by simultaneously milling specific substances together in a suitable bead mill (e.g. DYNO Mill Typ Multi Lab, Willy A. Bachofen AG, 0.6 L standard Inox steel/PA6 grinding vessel, ECM-Accelerators or KD-agitator discs, 0.5 mm diameter YSZ grinding balls). During the step of building block combination additional additives like organic carboxylates and free acids or mixtures thereof including fruit acids (e.g. glucuronic acid, mucinic acid, algenic acid, pectnic acid, maleinic acid, mandelic acid, benzoic acid, tartaric acid, citric acid, malic acid or succinic acid) may be introduced as well.

In an advantageous embodiment, the invention relates to a process wherein the combined building blocks (primary particles) are consolidated by application of heat or/and pressure or/and exposure to diluted steam to form aggregates characterized in that said primary particles are of the same type. This results in building blocks which are chemically uniform. This provides a higher flexibility to the manufacturer of a food product, as a specific combination of aggregates may be adapted to each specific food product.

In an advantageous embodiment, the invention relates to a process wherein the combined building blocks (primary particles) are consolidated by application of heat or/and pressure or/and exposure to diluted steam to form aggregates characterized in that said primary particles are of different types. This results in building blocks which are not chemically uniform. This provides ready-to use aggregates which may directly applied to a food product.

In a further advantageous embodiment, the invention relates to a process wherein aggregates obtained, in particular if in the size above about 1 millimeter, are crushed or broken down and separated to a specific size fraction amenable for application of the sub-structured salt. Separation or fractionation may take place by any means convenient, e.g. sieving.

In a further advantageous embodiment, the invention relates to a process wherein the primary particles are obtained by a FSP process.

In a further advantageous embodiment, the invention relates to a process wherein the primary particles are obtained by a wet milling process using a solvent that is essentially water free, such as an oil (in particular an oil that is physiologically acceptable) or a low boiling solvent (in particular a low boiling alcohol like methanol or ethanol).

The invention also relates to a table salt formulation obtained by a process as described herein.

In a fifth aspect, the invention relates to the use of a table salt formulation as described herein for the manufacture of a food product, in particular a dry food product.

The invention also relates to a method of use of a table salt formulation as described herein for the manufacture of a food product, in particular a dry food product.

MODES FOR CARRYING OUT THE INVENTION

To further illustrate the invention, the following examples are provided. These examples are provided with no intention to limit the scope of the invention.

Analysis: The substructure of the salt can be analyzed by a series of analytical tools.

a) Element composition: Atom absorption spectroscopy (AAS) or Laser Ablation Inductively Coupled Plasma Mass Spectrometry (LA-ICP-MS) after workup and quantitative dissolution as e.g. described by Gunther[3].

b) Element distribution: The preferred method to investigate the spatial distribution of elements in a sample is element mapping as e.g. possible by energy dispersive X-ray analysis in an SEM as e.g. described and used in[4]. This method is suitable at a spatial resolution down to the 10 nm level. Alternatively, for lower resolution (10 micrometer), rastering of a sample with a laser ablation system can give much more accurate compositions but at the expense of lower spatial resolution[5]. Alternatively, a micro-X-ray absorption spectrometer can be used.

c) Phase analysis. The dominant crystal phases give information of what combination of ions is present in a sample. It can e.g. distinguish between a mixture of sodium chloride crystals and calcium sulfate crystallites from a mixture of sodium sulfate and calcium chloride. While in some cases, the salt perception of such mixtures may not be affected by different mixtures of anion/cation pairs, in numerous cases; such distinction plays a role for the physical properties of the mixture. This is particularly useful as it allows distinction between presence of salt crystallites as claimed for group B (see background information) and absence of distinct salt crystals (as defined for group A (background info) where the constituents of the salt are present as aqueous ions. Latter give no diffraction pattern in X-ray diffraction.

d) Crystallite size. The size of the crystals or crystallites or agglomerates of crystallites in the case of a polycrystalline material can be best derived from scanning electron microscopy images or using X-ray diffraction and applying the Scherrer formula.

Starting materials: Unless otherwise specified, pure grade laboratory chemicals (solids, liquids, gases) were used as commercially available without further specific purification. Commercial food grade table salt was used as "Fine 50 Pure Dried Vacuum Salt, Glacia, British Salt, United Kingdom". Commercial high oleic sunflower oil ("HOSO") was used as "food grade, Cargill, United Kingdom".

Example 1

Preparation of NaCl Primary Particles by Milling

Different amounts (225 g, 450 g, 675 g, and 900 g) of food grade table salt were dried for 6 hours at 300° C. Subsequently, 1500 g of high oleic sunflower oil (HOSO) was added to each of the samples. Subsequently, the samples were strongly mixed with a magnetic stirrer or a mixing turbine (Ytron-Y, Ytron, Germany) and milled using a laboratory agitator bead mill (Dyno-mill multi lab, Willy A. Bachofen AG, Switzerland, 0.6 L standard Inox steel/PA6 grinding vessel, agitator discs or ECM-accelerators, 0.5 mm diameter Yttria Stabilized Zirconia (YSZ) grinding balls, filling degree 60-80%). The milling was run continuously using silicon tubes (inner diameter 8 mm, Siwa Silikon Schlauch, Unico-Haberkorn, Switzerland) and a flexible-tube pump (R17 DT71D4/TF, SEW Eurodrive, Germany). During milling the mill feed was continuously agitated. In case of sedimentation of mill material especially at high NaCl concentrations, intake of the salt into the tube was enhanced by manual picking of the sedimented salt with the tube opening. The milling was conducted at a maximal flow rate of 60 L/h and a maximal agitator disc speed of 12 m/s. Thereby, the pressure at the inlet of the grinding vessel was up to 1 bar and the temperature at the grinding vessel outlet never exceeded 100° C. For all the samples the grinding time was between 20 and 60 min. After grinding the samples were diluted with HOSO to a final concentration of 1.5 wt % and dispersed using an ultrasonic horn (200 W, cycle 0.5, 1 min, Hielscher GmbH UP-400S, Germany) for particle size distribution analyses. To determine particle size distributions, a BI-XDC X-ray disk centrifugation system (Brookhaven Instruments) was used. The geometric mean of the four samples is 0.48 micrometer, 0.53 micrometer, 0.52 micrometer and 0.60 micrometer, respectively. The particle size distributions were fitted with a lognormal function which can be described with ($mu_1=-0.737$, $sigma_1=0.091$), ($mu_2=-0.642$, $sigma_2=0.079$), ($mu_3=-0.648$, $sigma_3=0.102$) and ($mu_4=-0.504$, $sigma_4=0.140$), respectively.

Example 2

Preparation of NaCl Primary Particles by Flame Spray Pyrolysis

Flame spray pyrolysis was applied to synthesize nanometric sodium chloride. A precursor containing the corresponding metal loading Na and Cl was prepared by dissolution of amounts of sodium hydroxide (Ph. Eur., Fluka, Switzerland) in 2-ethylhexanoic acid (puriss., SigmaAldrich, Switzerland) at 140° C. and the addition of corresponding amounts of 1,2-dichloroethane (reinst, Merckt, Switzerland). The precursor was 2:1 diluted with tetrahydrofuran (puriss., stabilized, Riedel-de Haën, Switzerland). This low-viscosity liquid was delivered to a flame spray pyrolysis apparatus consisting of 4 equal burners by annular gear pumps (HNP Microsystems, Parchim, Germany) at 10 mL/min. The flames consisted of a central spray delivery and a circular premix flame. The precursor solution was pumped through a capillary (diameter 0.4 mm), dispersed with oxygen (Pan Gas, tech.) at 10 L/min and ignited in a mixture of methane (Pan Gas, tech.) at 1.13 L/min and oxygen (Pan Gas, tech.) at 2.4 L/min forming the premix flame. All gas flow rates were controlled by calibrated mass flow controllers (red-y compact, Vögtlin Instruments, Switzerland). The reactor setup was fully enclosed and the incoming air filtered by a conventional HEPA filter system and the offgas containing the product nanoparticles was conducted to the filtration cylinder and filtered (Tulona baghouse filters, PTFE on PTFE support, diameter 120 mm, length 1640 mm, Technische Textilien Lörrach GmbH & Co., Lörrach, Germany) using a total gas flow rate of 600-750 m3/h, resulting in an average filtration velocity of 7.6-9.4 cm/s. By applying regular impulses of pressured air, the produced nanoparticles fell off the filters and into the particle catchment tank where they could be collected.

The as prepared sodium chloride nanoparticles are of white appearance and hydrophilic. The volume-surface-average diameter of the as produced powder was evaluated by nitrogen adsorption using the BET method (according to[6]). The typical specific surface area (SSA) was between 40 and 60 m2/g which corresponds to a volume-surface-average diameter of between 69 and 46 nm.

Example 3

Preparation of Mixed Primary Particles NaCl/SiO2 and NaCl/Ca3(PO4)2

Flame spray pyrolysis was applied to synthesize nanoparticulate sodium chloride and sodium chloride in-situ doped with 5 wt % tricalcium phosphate (TCP) or silica. A precursor containing the corresponding metal loading Na and Cl was prepared by dissolution of amounts of sodium hydroxide (Ph. Eur., Fluka, Switzerland) in 2-ethylhexanoic acid (puriss., SigmaAldrich, Switzerland) at 140° C. and the addition of corresponding amounts of 1,2-dichloroethane (reinst, Merckt, Switzerland) or corresponding amounts of calcium 2-ethylhexanoate prepared from calcium hydroxide (Ph. Eur., Riedel de Haen, Seelze, Germany) dissolved in 2-ethylhexanoic acid (puriss., SigmaAldrich, Switzerland) at 140° C., and tributyl phosphate (Acros Organics, Geel, Belgium) or hexamethyldisiloxane (98%, Aldrich, Switzerland) were added to the sodium chloride precursor (preparation as described in example 2). These three precursors were 2:1 diluted with tetrahydrofuran. The mixtures were fed through a capillary (diameter 0.4 mm) into a methane (1.13 L/min, tech., Pan Gas, Switzerland)—oxygen (2.4 L/min, tech., Pan Gas, Switzerland) flame using a gear-ring pump (HNP Mikrosysteme, Parchim, Germany) at 5 mL/min). Oxygen at 5 L/min (tech., Pan Gas, Switzerland) was used to disperse the liquid leaving the capillary. Calibrated mass flow controllers (Brooks Instrument, Hatfield, Pa., USA) were used to control all gas flows. The as-formed nanoparticles were collected on glass fibre filters (GF/A, 25.7 cm diameter, Whatman, Maidstone, United Kingdom), placed on a cylinder mounted above the flame, by the aid of a vacuum pump (Seco SV 1040 C, Busch, Switzerland). The specific surface area (SSA) of as-prepared powders was between 40 and 60 m2/g which corresponds to a volume-surface-average diameter of between 69 and 46 nm.

Example 4

Preparation of a Sub-Structured Salt by Simultaneous Milling

A "fleur de sel"-type mixture containing 98.9 wt % food grade table salt, 0.5 wt % $CaSO_4.2H_2O$ (reinst, AppliChem), 0.3 wt % $MgCl_2 \cdot 6H_2O$ (Ph. Eur., Fluka), 0.2 wt % $MgSO_4 \cdot 7H_2O$ (Ph. Eur., Fluka) and 0.1 wt % KCl (puriss., Riedel-de Haën) was filled into a 2 L Schott flask and dried for 6 hours at 300° C. Subsequently, 1500 g of high oleic sunflower oil (HOSO) was added to the sample. Then, the sample was strongly mixed with a magnetic stirrer and milled using a laboratory agitator bead mill (Dyno-mill multi lab, Willy A. Bachofen AG, Basel, Switzerland, year of manufacture 2006, 0.6 L standard Inox steel/PA6 grinding vessel, agitator discs or accelerators, 0.5 mm diameter YSZ grinding balls, filling degree 60-80%). The milling was run continuously using silicon tubes (inner diameter 8 mm, Siwa Silikon Schlauch, Unico-Haberkorn, Switzerland) and a flexible-tube pump (R17 DT71D4/TF, SEW Eurodrive, Germany). During milling the mill feed was continuously agitated. In case of sedimentation of mill material, intake of the salt into the tube was enhanced by manual picking of the sedimented salt with the tube opening. The milling was conducted at a maximal flow rate of 60 L/h and a maximal agitator disc speed of 12 m/s. Thereby, the pressure at the inlet of the grinding vessel was up to 1 bar and the temperature at the grinding vessel outlet never exceeded 100° C. The grinding time was 55 min. After grinding the samples were diluted with HOSO to a final solid content concentration of 1.5 wt % and dispersed using an ultrasonic horn (200 W, cycle 0.5, 1 min, Hielscher GmbH UP-400S, Germany) for particle size distribution analyses.

To determine particle size distributions a BI-XDC X-ray disk centrifugation system (Brookhaven Instruments) was used. The geometric mean of the sample is 0.55 micrometer.

Example 5

Stability Test I

The crystal growth the three as-prepared powders described in example 3 was further analyzed. Crystal growth inherently amounts to a lower BET specific surface area (SSA) of the particles. Therefore, the SSAs of the as-produced powders (see Exp. 3) were compared to the SSAs after 6 days in ambient air. After a 6-day storage time in ambient air the SSA of the pure sodium chloride particles was 1 m2/g which corresponds to a mean particle diameter of 2500 nm. This sintering of the nanoparticles was strongly inhibited by the presence of silica or tricalcium phosphate. After 6 days, these two samples showed BET SSAs of 59 and 47 m2/g which corresponds to a mean particle diameter of 46 and 58 nm for the 5 wt % silica and the 5 wt % tricalcium phosphate samples, respectively. Therefore, the in-situ addition of silica or salts like tricalcium phosphate inhibits crystal growth and hence prolongs shelf life of the nanoparticles.

Example 6

Stability Test II

Different concentrations of sodium chloride (Fine 50 Pure Dried Vacuum Salt, Glacia, British Salt, United Kingdom) were milled in high oleic sunflower oil (Cargill, United Kingdom) to a particle size of below 1 micrometer (particle size distribution as measured by XDC, see example 1). These four samples were stored in closed Schott flasks and the particle size distribution measured again after a storage time of 30 days. The measured particle size distributions still have a log normal shape. The geometric mean of the four samples is 0.69 micrometer, 0.59 micrometer, 0.68 micrometer and 0.98 micrometer, respectively, which corresponds to a median shift of 12 to 63%. The particle size distributions were fitted with a lognormal function leading to can be described with ($mu_1$=−0.375, $sigma_1$=0.129), ($mu_2$=−0.530, $sigma_2$=0.108), ($mu_3$=−0.391, $sigma_3$=0.124) and ($mu_4$=−0.016, $sigma_4$=0.217), respectively. Considering the storage time of 30 days, these results show an enhanced size stability created by a protecting oil layer on the surface of the milled salts. Thus, storage under oil improves stability of the NaCl micron-sized particles.

Example 7

Saltiness Testings 10 wt % milled pure sodium chloride (Fine 50 Pure Dried Vacuum Salt, Glacia, British Salt, United Kingdom) in high-oleic sunflower oil (HOSO) slurries produced as detailed in example 1 with an XDC particle size of around 0.6 micrometer were homogeneously sprayed onto potato chips (unsalted potato chips, Walkers, United Kingdom) to a final salt content on the chips of 1.2 wt % and a total HOSO concentration of 33 wt %. These chips were sensory tested in a triangle test and compared to ready salted potato chips containing 1.5 wt % salt and 33 wt % HOSO (ready salted potato chips, Walkers, United Kingdom). In this test 120 consumers compared two samples of the reference (ready salted potato chips, Walkers, United Kingdom) and one sample of the salt-in-oil-slurry applied to unsalted chips with a 20 wt % reduced salt content. The consumers failed to determine any differences between these samples which means that by the application of micron-sized pure sodium chloride building blocks the sodium content could be reduced by 20 wt % without lowering the saltiness.

While there are shown and described presently preferred embodiments of the invention, it is to be distinctly understood that the invention is not limited thereto but may be otherwise variously embodied and practiced within the scope of the following claims.

The following documents are identified in this specification and are included by reference.
1. Friedlander, S. K. Smoke, dust, and haze (Oxford University Press, New York, 2000).
2. Schubert, H. Handbuch der mechanischen Verfahrenstechnik (Wiley-VCH, Weinheim, 2003).
3. Gunther, D., Horn, I. & Hattendorf, B. Recent trends and developments in laser ablation-ICP-mass spectrometry. Fresenius Journal of Analytical Chemistry 368, 4-14 (2000).
4. Vollenweider, M. et al. Remineralization of human dentin using ultrafine bioactive glass particles. Acta Biomaterialia 3, 936-43 (2007).
5. Gunther, D., Frischknecht, R., Heinrich, C. A. & Kahlert, H. J. Capabilities of an Argon Fluoride 193 nm excimer laser for laser ablation inductively coupled plasma mass spectrometry microanalysis of geological materials. Journal of Analytical Atomic Spectrometry 12, 939-944 (1997).
6. Janssen, E., Zirkzee, H. F., German, A. L. & Maxwell, I. A. Particle Sizing of Flocculated Latex-Particles by Physisorption of Nitrogen. Journal of Applied Polymer Science 52, 1913-1916 (1994).

The invention claimed is:
1. Food product which is dry and which comprises a table salt formulation wherein
   a) said table salt formulation comprises aggregates of a mixture of at least two types of primary particles of one or more inorganic salts suitable to human nutrition, wherein each said aggregate comprises sintered primary particles, and
   b) at least 50 wt % of said primary particles are 5-5000 nanometer in diameter.
2. The food product according to claim 1 wherein said table salt formulation comprises at least 70 wt % NaCl or NaCl/KCl— particles, and at most 30 wt % of particles of one or more other inorganic salts suitable to human nutrition.
3. The food product according to claim 1 wherein said table salt formulation is composed of said primary particles of which at least 70% are 20-2000 nanometer in diameter.
4. The food product of claim 1 wherein a cation of said inorganic salt suitable to human nutrition is selected from the group consisting of alkali metal ions, earth alkali ions, and transition metal ions, and an anion(s) of said salt(s) is selected from the group consisting of phosphates, sulfates, silicates, hydroxides, halogenides, carbonate, and hydrogencarbonate.

5. The food product of claim 1 wherein said inorganic salt suitable to human nutrition is selected from the group consisting of NaCl, CaSO$_4$, CaCl$_2$, MgSO$_4$, MgCl$_2$, KCl.

6. The food product of claim 1, wherein said aggregates consist of 10-10$^{15}$ said primary particles.

7. A table salt formulation comprising a mixture of at least two types of particles, wherein
each type of said particles contains one or more inorganic salts suitable to human nutrition and
each type of said particles is composed of primary particles of which at least 50 wt % are 5-5000 nanometer in diameter and
said primary particles are formed to aggregates containing 10-10$^{15}$ of said primary particles, wherein each said aggregate comprises sintered primary particles.

8. The table salt formulation of claim 7 wherein said table salt formulation comprises at least 70 wt % NaCl or a mixture of NaCl/KCl particles, and at most 30 wt % of particles of said one or more other inorganic salts suitable to human nutrition.

9. The table salt formulation of claim 7, wherein a first type of particles contains 90 to 99.5 wt-% NaCl and 0.5-10 wt-% of one or more compounds selected from the group consisting of SiO$_2$, CaCO$_3$, Ca$_3$(PO$_4$)$_2$, and optionally magnesium doped calcium phosphate.

10. A table salt formulation comprising aggregates of primary particles of one and only one inorganic salt suitable to human nutrition, wherein said primary particles are between 5 and 5000 nanometers in diameter, wherein each said aggregate comprises sintered primary particles.

11. The table salt formulation of claim 10 wherein a cation of said inorganic salt suitable to human nutrition is one selected from the group consisting of alkali metal ions, earth alkali ions, and transition metal ions, and wherein an anion of said inorganic salt suitable to human nutrition is one selected from the group consisting of phosphates, sulfates, silicates, hydroxides, halogenides, carbonate, and hydrogencarbonate.

12. The table salt formulation of claim 10 wherein each said aggregate of said primary particles comprises between 10 and 10$^{15}$ primary particles.

13. The table salt formulation of claim 10 wherein said inorganic salt suitable to human nutrition is selected from the group consisting of NaCl, CaSO$_4$, CaCl$_2$, MgSO$_4$, MgCl$_2$, and KCl.

* * * * *